United States Patent [19]

Tarusawa

[11] Patent Number: 5,669,422
[45] Date of Patent: Sep. 23, 1997

[54] SLOW START VALVE

[75] Inventor: Tetsunobu Tarusawa, Komaki, Japan

[73] Assignee: CKD Corporation, Japan

[21] Appl. No.: 628,339

[22] Filed: Apr. 5, 1996

[30] Foreign Application Priority Data

Apr. 7, 1995 [JP] Japan .................................. 7-107877

[51] Int. Cl.[6] .......................... F15B 13/043; F15B 21/10
[52] U.S. Cl. ........................ 137/625.64; 91/29; 137/110
[58] Field of Search ...................... 91/29; 137/110, 137/625.64

[56] References Cited

U.S. PATENT DOCUMENTS

Re. 30,403   9/1980   Bitonti ............................. 137/110 X
5,067,519   11/1991   Russell et al. .................... 137/596.14
5,337,788    8/1994   Nelson ............................. 137/627.5

*Primary Examiner*—Gerald A. Michalsky
*Attorney, Agent, or Firm*—Finnegan, Henderson, Farabow, Garrett & Dunner, L.L.P.

[57] ABSTRACT

A slow start valve has a first valve member for opening and blocking a flow passage between an inlet port and an outlet port and a second valve member for opening and blocking a flow passage between the outlet port and an exhaust port, both being integrally formed in a spool without adopting a poppet construction, wherein the actuation of the spool by force of compressed air causes slow supply, quick supply and exhaust. Compressed air supplied via a solenoid three-way valve causes a piston to move downward along with the spool in contact therewith and then compressed air supplied via a passage causes the spool to move further downward, a second valve opening being immediately shut off with the second valve member.

19 Claims, 10 Drawing Sheets

SLOW START VALVE

BACKGROUND OF THE INVENTION

1. Field of the Invention

The present invention relates to slow start valves provided with a quick exhaust function to conduct slow supply of compressed air to pneumatic equipment and, after that, quick supply thereto, in order to prevent cylinders and others mounted in pneumatic equipment from inadvertently shifting owing to the compressed air being supplied to the pneumatic equipment during start-up thereof. More particularly, the present invention relates to slow start valves capable of changing slow air supply operation to quick supply operation in a short time even when using small sized solenoid valves to actuate the slow start valve and also providing improvements in size by applying a spool construction in a main valve.

2. Description of Related Art

In operating pneumatic equipment, usually, predetermined air pressure is supplied to the equipment from a source of compressed air and, alternatively, in stopping the operation of the equipment, the air supplied in the pneumatic equipment is exhausted to remove the air pressure acting on the equipment. In resuming operation of the pneumatic equipment, predetermined air pressure is supplied to actuate the equipment. At this time, if compressed air is rapidly supplied to the equipment on which no air pressure acts, cylinders mounted in the equipment will, contrary to expectations, be moved inadvertently. In this way, when the cylinders drift inadvertently and rapidly, the equipment will interfere with operation of other equipment disposed downstream, while not causing any interference therewith in a normal state. This causes a problem in the pneumatic equipment itself.

To avoid such a problem, conventional pneumatic equipment is usually provided with a slow start valve whereby, to prevent compressed air from rapidly being supplied into the equipment during start-up of the equipment, a small amount of compressed air is initially supplied and then a normal amount of the same is supplied after the air pressure in the equipment has reached a certain value.

Figure 9:
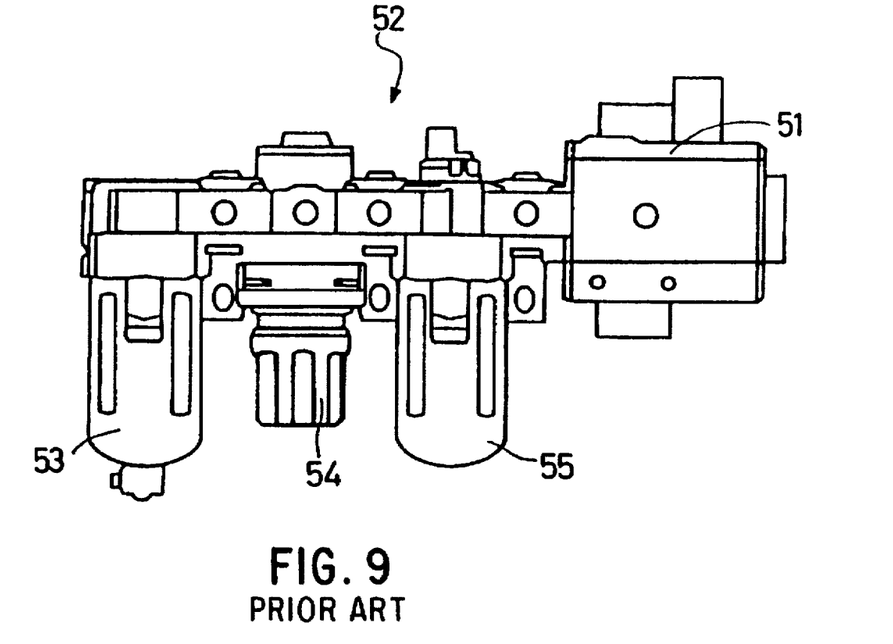
FIG. 9 is a side view of a pneumatic equipment having a slow start valve.
Figure 10:
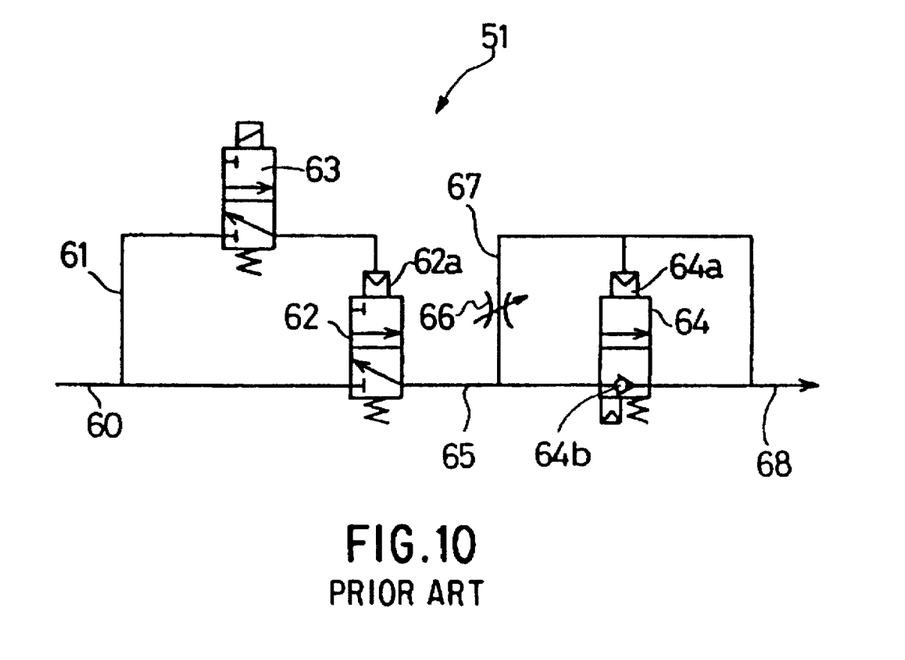
FIG. 10 is a schematic view showing a conventional slow start valve, using pneumatic symbols.

Conventional slow start valves used in pneumatic equipment will be described below with reference to FIGS. 9 and 10. FIG. 9 is an exterior side view of a sample of a pneumatic equipment having a conventional slow start valve and FIG. 10 is a schematic diagram, using pneumatic symbols, of the construction of the conventional slow start valve.

As shown in FIG. 9, a pneumatic equipment 52 having a slow start valve 51 is constructed of a pneumatic filter 53, a pressure reducing valve 54 and a lubricator 55, which are connected in series.

Compressed air supplied from a source of air (not illustrated) to the pneumatic equipment 52 first flows into the pneumatic filter 53 and solid foreign material such as scale in pipes and moisture are removed from the compressed air to produce clean compressed air. The cleaned compressed air flows into the pressure reducing valve 54. The pressure reducing valve 54 exercises control such that the primary pressure of compressed air flowing into the valve 54 is reduced and the secondary pressure of the same to be exhausted from the valve 54 is regulated to have a predetermined pressure value.

The compressed air with its pressure regulated by the pressure reducing valve 54 flows in the lubricator 55, and lubricating oil in a form of mist is supplied. The air further flows in the slow start valve 51. The slow start valve 51 controls the flow of compressed air to be supplied to the pneumatic equipment 52 to prevent compressed air from flowing at a stroke into the pneumatic equipment 52 when it is supplied thereto during start-up of the equipment 52.

The above mentioned slow start valve 51 will be explained below with reference to FIG. 10.

This slow start valve 51 is constructed mainly of a three-way valve 62 connected in the primary side of the valve 51 and a solenoid valve 63 which serves as a pilot valve to actuate the three-way valve 62. More particularly, the solenoid valve 63 is connected to a flow passage 61 diverted from an inlet passage 60 and further joined with a pilot port 62a of the three-way valve 62. This three-way valve 62 is connected with a master valve 64 via a flow passage 65.

Needle valve 66 for restricting the flow amount of compressed air exhausted from the three-way valve 62 is mounted on a flow passage 67 diverted from the passage 65. This passage 67 is connected to the pilot port 64a of the master valve 64 and an outlet passage 68 to which the master valve 64 is connected.

Operation of the slow start valve 51 constructed as above is described hereinafter, referring to FIGS. 9 and 10. Compressed air flowing from the lubricator 55 into the inlet passage 60 is allowed to flow through the passage 61 to the solenoid valve 63, not the three-way valve 62, by force of an electromagnetic portion of the solenoid valve 63. Such compressed air flowing via the solenoid valve 63 is allowed to flow in the pilot port 62a of the three-way valve 62, thereby communicating the inlet passage 60 with the passage 65.

The compressed air flowing in the passage 65, as being prevented from flowing in an outlet passage 68 owing to a check valve 64b of the master valve 64, flows only through a flow passage 67 and there the flow of compressed air is controlled through a needle valve 66. After passing through the needle valve 66, the compressed air flows in the outlet passage 68 and at the same time in the pilot port 64a of the master valve 64. In this way, when compressed air gradually flows via the passage 67 into the outlet passage 68, the pressure to actuate pneumatic equipments disposed downstream gradually increases accordingly. After that, when the pressure reaches a predetermined level, the master valve 64 opens to allow compressed air to flow so as to reach an actuation pressure.

According to the slow start valve 51 mentioned above, consequently, it is possible to prevent sudden supply of compressed air at the time of actuating the downstream pneumatic equipment and thus each driving section of the pneumatic equipment from being operated at a stroke. This makes it possible to prevent the downstream pneumatic equipment from having trouble caused by the interference of equipment which does not interfere in a normal state, for example.

Figure 11:
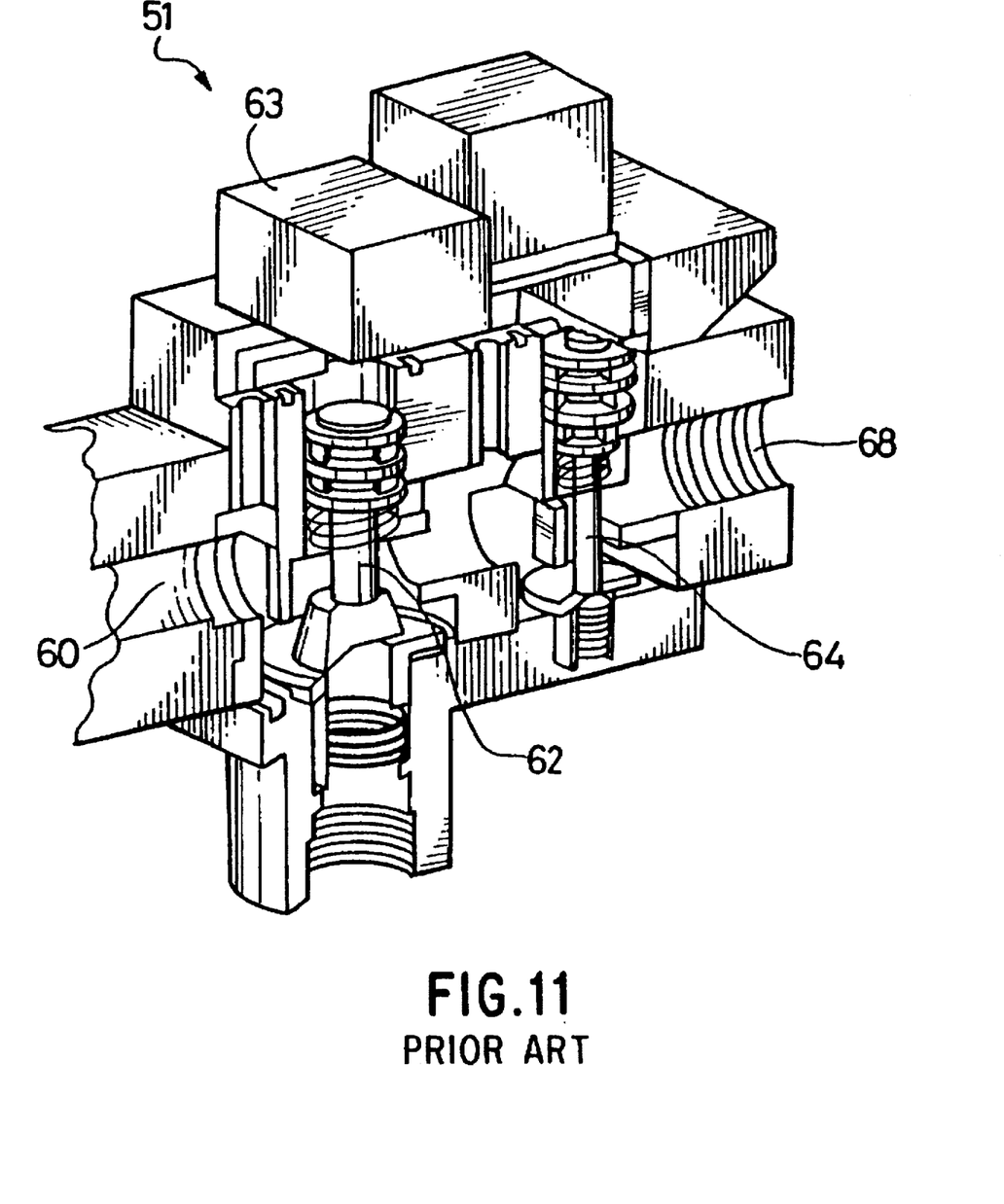
FIG. 11 is a perspective, partially sectional view of a conventional slow start valve.

The aforementioned slow start valve 51, however, also has disadvantages as will be described below with reference to FIG. 11. The slow start valve 51, partially and cross-sectionally shown in FIG. 11, needs the three-way valve 62 and the master valve 64, respectively, constructed of a valve structure having a cylinder and a valve member, consequently requiring space for the two valve structures and also passages for flow communication of compressed air between those valve structures. This causes a problem of making the slow start valve 51 larger in size, possibly resulting in restriction in mounting the slow start valve 51 on the pneumatic equipment 52 and the like. Similarly, since it is difficult to improve the slow start valve 51 in terms of size, it affects the installing of it on other equipment.

Relatively small-sized slow start valves are disclosed in U.S. Pat. Nos. 5,067,519 and 5,337,788. The slow start valves are similar in basic structure, each of which includes a needle valve passage defined inside of a body of the valve, and a main valve member formed of a poppet structure for opening and blocking a flow passage between an inlet port and an outlet port, and is constructed such that, during start-up period, the flow rate of compressed air being supplied via the inlet port when a solenoid valve is opened is regulated through a needle valve passage and directed to an outlet port, thereby conducting slow supply, and after a predetermined time, the pressure in the valve increased during the slow supply acts on the main valve member to allow the flow passage to communicate between the inlet port and the outlet port, thereby effecting quick supply of compressed air.

In the above-mentioned slow start valves described in these U.S. patents, a needle valve passage is provided inside of the body of the valve, thus causing a large sized body and making the slow start valve itself larger in size accordingly. With the main valve member being of a poppet structure, the number of components forming the main valve member increases inevitably owing to its poppet structure, so that the cost of the entire slow start valve increases remarkably.

As mentioned above, outstanding problems remain in the slow start valves disclosed in the U.S. patents.

SUMMARY OF THE INVENTION

The present invention has been made in view of the above circumstances and has an object to overcome the above problems and to provide a slow start valve in which a main valve is constructed integrally of a valve member for opening and closing a flow passage between an inlet port and an outlet port and another valve member for opening and closing a flow passage between the outlet port and an exhaust port. The main valve is formed of a spool structure and a needle valve passage is provided inside of such a main valve, thereby enabling reduction of size, reduction of the number of components and of cost.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a slow start valve of this invention comprises a valve body having an inlet port, an outlet port and a secondary pressure exhaust port, and defining a main flow passage between the inlet port and the outlet port, a main valve for controlling fluid flow between the inlet, outlet and exhaust ports, slidably disposed within the valve body, a bypass flow passage diverging from the main flow passage in the valve body, a flow adjusting member disposed in the bypass flow passage, and a control valve for controlling flow of fluid directed in the bypass flow passage, the control valve controlling supply of slight flow of fluid via the bypass flow passage to the outlet port for a predetermined period from a start of fluid supply via the inlet port to provision of fluid communication through the main flow passage by the main valve, wherein the main valve is constructed of a first valve member for controlling opening and blocking of the main flow passage and a second valve member for controlling opening and blocking the bypass flow passage between the outlet port and the exhaust port, the first and second valve members being formed coaxially and integrally with each other.

In the slow start valve of the present invention, a slight flow of fluid is supplied via the bypass flow passage to the outlet port for a predetermined period from a start of fluid supply via the inlet port to provision of fluid communication through the main flow passage by the main valve constructed of the first and second valve members, conducting a slow supply. After the predetermined period, when the main flow passage is opened via the first valve member and the bypass flow passage between the outlet port and the exhaust port is shut off via the second valve member, fluid flow is supplied via the inlet port to the outlet port, conducting a fast supply.

As described above, the main valve member is constructed of a first valve member for opening and closing a main flow passage between an inlet port and an outlet port and a second valve member for opening and closing a passage between the outlet port and an exhaust port, both valve members being integrally and coaxially formed, and the actuation of the main valve member is caused by compressed air to apply slow supply, quick supply, and exhaust. The present invention, without needing two valve structures as in conventional valves, can construct a valve member of one main valve member, easily achieving a small-sized slow start valve.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

Detailed description of preferred embodiments of a slow start valve embodying the present invention will now be given referring to the accompanying drawings.

A slow start valve in a first embodiment is first described with reference to FIGS. 1, 2 and 3.

Figure 1:
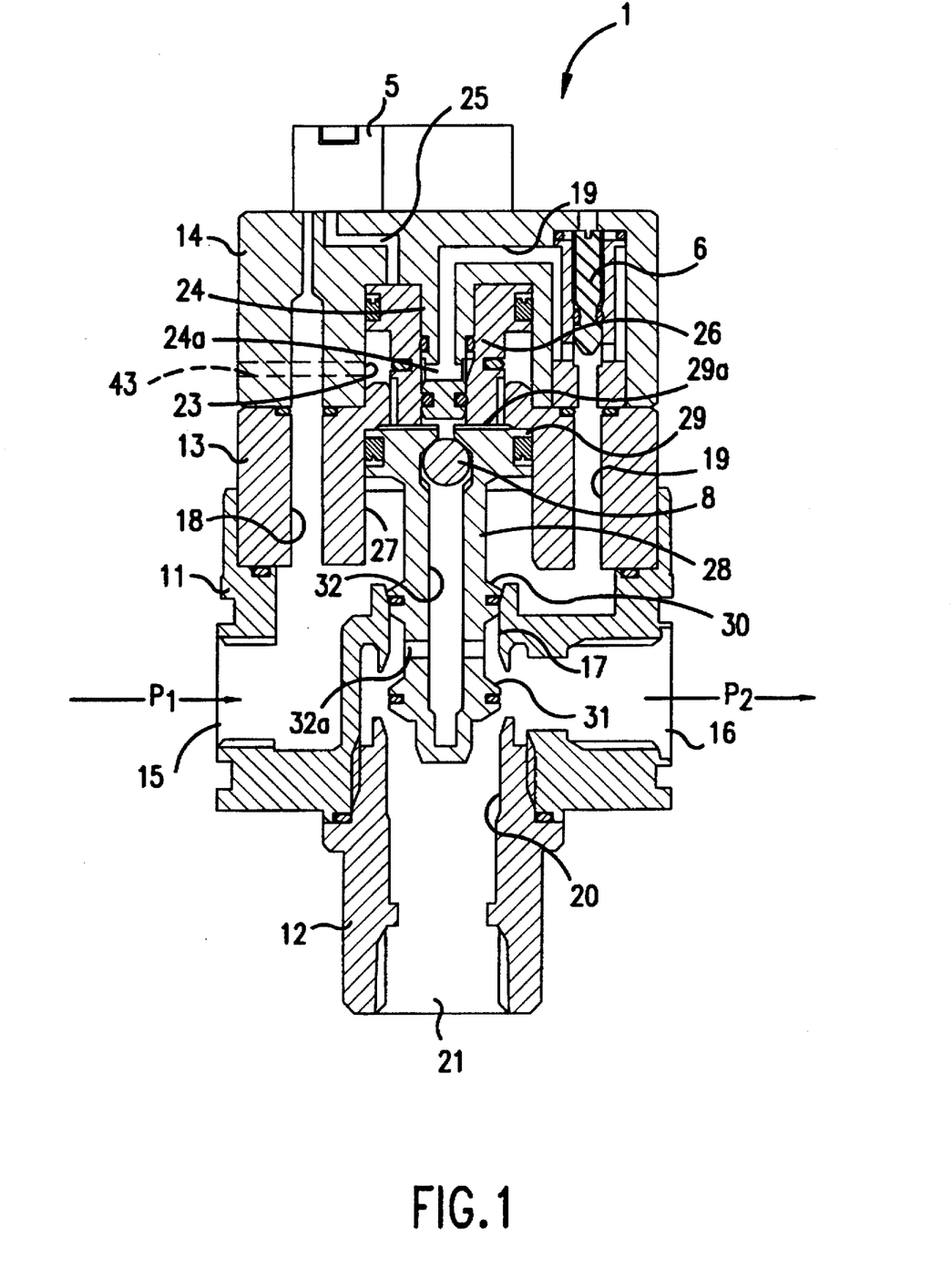
FIG. 1 is a sectional view of a slow start valve of a first embodiment in accordance with the present invention.

In FIG. 1, a slow start valve 1 is provided with a solenoid three-way valve 5 mounted on the upper surface of a main body of the slow start valve 1. The main body of the valve 1 is constituted of a body member 11 in which an inlet port 15 and an outlet port 16 are formed, a bottom plug 12 having an exhaust port 21 opening into the atmosphere, connected to a lower part of the body member 11, a cylinder block 13 mounted on an upper part of the body member 11 and a cap 14 covering an upper surface of the cylinder block 13.

The inlet port 15 and the outlet port 16 formed in the body member 11 communicate with each other through a first valve opening 17 being in the form of a cylindrical hole. The inlet port 15 communicates with two passages 18 and 19 extending over both the cylinder block 13 and the cap 14. The outlet port 16 communicates with the exhaust port 21 through a second valve opening 20 being in the form of a cylindrical hole formed in the bottom plug 12 so as to be coaxial with the first valve opening 17.

The passage 18 communicating with the inlet port 15 is connected with an inlet port (not illustrated) of the solenoid three-way valve 5 on the opposite end. In the passage 19, interposed is a needle valve 6 for restricting the flow of compressed air flowing via the inlet port 15.

The cap 14 includes a cylinder 23 in which a convex portion 24 is formed coaxially with the cylinder 23. This convex portion 24 is constructed such that its upper portion has a constant diameter and is internally provided with a flow passage 19 leading to the downstream side of the needle valve 6, its end portion (lower portion) has a smaller diameter than that of the upper portion, and an exhaust port 24a leading to the flow passage 19 is formed around a border between the upper portion and the end portions. The cylinder 23 is connected with an outlet port (not shown) of the solenoid three-way valve 5 through a passage 25. The cap 14 further has a passage 43 extending from the cylinder 23 to the atmosphere.

In the cylinder 23, mounted is a piston 26 having a cylindrical opening which contacts slidably with the outer surface of the convex portion 24 at the upper part than the exhaust port 24a, the piston 26 being slidable via the opening with respect to the convex portion 24. The outer peripheral surface of the piston 26 slidably contacts with the inner surface of the cylinder 23 at all times. The opening of the piston 26, extending along the center of the piston 26, has an upper inner diameter corresponding to the outer diameter of the upper portion of the convex portion 24 and a lower inner diameter corresponding to the outer diameter of the end portion of same. Accordingly, the piston 26 is moved downward in the cylinder 23 with the upper outer surface thereof sliding on the inner surface of the cylinder 23, the upper inner surface of the opening sliding on the upper portion of the convex portion 24 and the lower inner surface sliding on the end portion of the convex portion 24 to a predetermined position. At the point where the piston 26 is moved downward by a predetermined distance, a space will occur between the upper inner surface of the opening and the end portion of the convex portion 24, as shown in FIG. 2.

In the cylinder block 13, a cylinder 27 is formed coaxially with the cylinder 23 and therein a spool 28 is slidably inserted. The upper end of the spool 28 is formed of a piston 29, on the upper surface of which several slits are provided. The spool 28 is further provided, integrally below the piston 29, with a first valve member 30 which slidably moves in the first valve opening 17 formed in the body member 11 and second valve member 31 which slidably moves in the second valve opening 20. An air hole 32 is formed in the spool 28 along the axis of the spool 28, and opens at its upper end and has an exhaust port 32a near its lower end. In the upper end portion of the air hole 32, a check valve 8 serving as a nonreturn valve is disposed.

Operation of the slow start valve 1 constructed as above in the first embodiment will be described below.

Before supply of compressed air via the inlet port 15, the spool 28 is held in a position shown in FIG. 1 with the top surface contacted with the upper surface of the cylinder 27 due to sliding resistance between the outer surface of the piston 29 and the inner surface of the cylinder 27. Thus, the upper end portion of the piston 26 remains contacted with the upper end surface of the cylinder 23.

When compressed air (pressure P1) is provided via the inlet port 15, it biases the lower surface of the piston 29 and flows in the passages 18 and 19. At this time, the first valve opening 17 is shut out as the first valve member 30 contacts thereto, preventing compressed air from flowing therethrough in the outlet port 16. The secondary pressure P2 of the outlet port 16 at this time is equal to zero.

Compressed air flowing in the passage 18 flows in the solenoid three-way valve 5 being in a supply state by its electromagnetic portion (not shown) energized and is directed via a passage 25 to the cylinder 23, then biasing the piston 26 downward. This makes the piston 26 slide downward while pushing downward the piston 29 of the spool 28 as contacted therewith, as shown in FIG. 2. During downward shifting of the piston 26, the air deflation from the cylinder 23 is effected through the passage 43. On the other hand, the compressed air flowing in the passage 19 passes through the needle valve 6 restricting the flow of the compressed air and the restricted flow of air is supplied into the opening of the piston 26 via the exhaust port 24a of the convex portion 24.

Simultaneously, as previously mentioned, a space is produced between the inner surface of the piston 26 and the outer surface of the convex portion 24 when the piston 26 is moved downward. Accordingly, compressed air flowing via the passage 19 flows through the opening of the piston 26, the check valve 8 and the air hole 32 to the exhaust port 32a.

The slow start valve 1 is, however, designed so that during movement the spool 28 downward, the piston 26 is moved with the inner surface of the opening thereof in contact with the end portion of the convex portion 24 until the second valve member 31 comes into contact with the second valve opening 20. The compressed air flowing via the flow passage 19 is allowed to exhaust from the exhaust port 32a when the second valve member 31 comes into contact with and slides in the second valve member 20, and also the first valve member 30 slides in the first valve opening 17 in contact therewith. The compressed air exhausted via the exhaust port 32a is therefore prevented from flowing out through the exhaust port 21 to the atmosphere.

Consequently, the compressed air exhausted via the exhaust port 32a is supplied through the outlet port 16 to a pneumatic equipment not shown. The secondary pressure P2 of the outlet port 16 at this time exists in the range from 0 to 0.65 P1, being expressed by 0<P2<0.65 P1. The compressed air to be exhausted via the outlet port 16 is directed via the passage 19 and restricted with the needle valve 6 as above, so that the pressure in the pneumatic equipment gradually increases.

In this way, although the compressed air is continuously supplied via the passage 19, the piston 26 initially remains contacted with the spool 28, because the sum of the thrust by the pressure acting on the lower surface of the piston 29 and starter resistance resulting from each sliding movement between the piston 29 and the cylinder 27, the first valve member 30 and the first valve opening 17, and the second valve member 31 and the second valve opening 20 is greater than the thrust by the pressure acting on the upper surface of the piston 29. The spool 28 is thus held in a state shown in FIG. 2.

When supplying of compressed air is continued, further, compressed air flows through the slit 29a into a space between the outer peripheral surface of the piston 26 and the inner wall of the cylinder 27, increasing gradually the pressure acting on the upper surface of the piston 29. At the point when the thrust by the pressure acting on the upper surface of the piston 29 exceeds the sum of the thrust by the pressure acting on the lower surface of the piston 29 and the starter resistance occurring between each sliding surface of the piston 29, the first and second valve members 30 and 31, the spool 28 is immediately moved downward as shown in FIG. 3.

When the first valve member 30 has passed through the first valve opening 17 due to the downward shifting of the spool 28, compressed air supplied via the inlet port 15 flows through the space between the lower surface of the piston 29 and the upper end of the first valve opening 17, and the first valve opening 17 to the outlet port 16. The secondary pressure of the outlet port 16 at this time exists in the range from 0.65 P1 to P1; 0.65 P1<P2<P1. At this time, the second valve member 31 is in contact with the second valve opening 20, thus having the exhaust port 20 closed.

As mentioned above, before the first valve opening 17 opens, compressed air is merely supplied little by little via the exhaust port 32a to the outlet port 16 and then, when the inlet port 15 communicates the outlet port 16 directly via the first valve opening 17, compressed air is supplied in great amount via the outlet port 16 to pneumatic equipment.

Compressed air supplied to the outlet port 16 is also prevented from flowing back to the passage 19 with the check valve 8 disposed in the air hole 32, so that it can retain a stable actuating condition of the pneumatic equipment to which the compressed air is being supplied.

When it is desired to stop or required to stop urgently operation of the pneumatic equipment, meanwhile, the power supply to the solenoid three-way valve 5 is stopped. The outlet port of the solenoid valve 5 comes to be in an exhaust state, accordingly, so that the compressed air inside of the cylinder 23 is exhausted and the inside pressure thereof decreases. With the decrease in the pressure in the cylinder 23, the piston 26 is moved upward by force of the pressure in the cylinder 27 to a position shown in FIG. 1, closing the exhaust port 24a. Simultaneously, the compressed air existing in the cylinder 27 is exhausted via the passage 43 to the atmosphere, decreasing the pressure acting on the upper surface of the piston 29 in the cylinder 27. The spool 28 is allowed to move back to a position shown in FIG. 1 by force of the compressed air being supplied via the inlet port 15. As a result, the outlet port 16 and the exhaust port 21 communicate with each other and the compressed air is exhausted via the exhaust port 21 from the pneumatic equipment to remove the pressure acting thereon.

As described above, the slow start valve 1 in the first embodiment is provided with the spool 28 constructed integrally of the first valve member 30 for opening and blocking the flow passage between the inlet port 15 and the outlet port 16 and the second valve member 31 for opening and blocking the flow passage between the outlet port 16 and the exhaust port 21, wherein the spool 28 is actuated by force of the pressure of compressed air to conduct slow supply, quick supply and, exhaust of compressed air. The slow start valve, different from conventional slow start valves, does not need two valve constructions and can provide a valve body of the slow start valve by using only a spool 28. This can achieve readily a slow start valve 1 of small-size.

The slow start valve 1 in the first embodiment uses a spool construction that both first and second valve members 30 and 31 are formed integrally in the spool 28, so that it can provide improvements in terms of reduction of the number of components necessary for the slow start valve 1 and remarkable reduction of costs thereof.

In addition, the above slow start valve 1 is constructed such that the compressed air supplied via the solenoid three-way valve 5 to the cylinder 23 causes the piston 26 to move downward, pushing the spool 28 at the same time, and then the compressed air supplied via the passage 19 causes the spool 28 to move further downward, separating from the piston 26, so that the second valve opening 20 is immediately shut off with the second valve member 31.

The slow start valve 1 consequently will not be in all ports simultaneously in an open state as shown in conventional slow start valves, namely, all ports including the inlet port, the outlet port and the exhaust port leading to the atmosphere are not in an open state at the same time, so that it can prevent efficiently a large flow of compressed air from being exhausted via the exhaust port 21 during start-up of the slow start valve thereby to avoid wasteful use of compressed air.

A second embodiment of slow start valves in accordance with the present invention will be described with reference to FIG. 4.

The slow start valve in this second embodiment has a construction substantially similar to that of the first embodiment, except for a spring mounted between a lower end portion of the spool 28 and a protrusion formed in the inner wall of the bottom plug 12. The following description for the second embodiment is therefore related only to the different construction from the first embodiment. The components of the slow start valve in the second embodiment are indicated by reference numerals similar to those of corresponding or similar components of the first embodiment.

Figure 4:
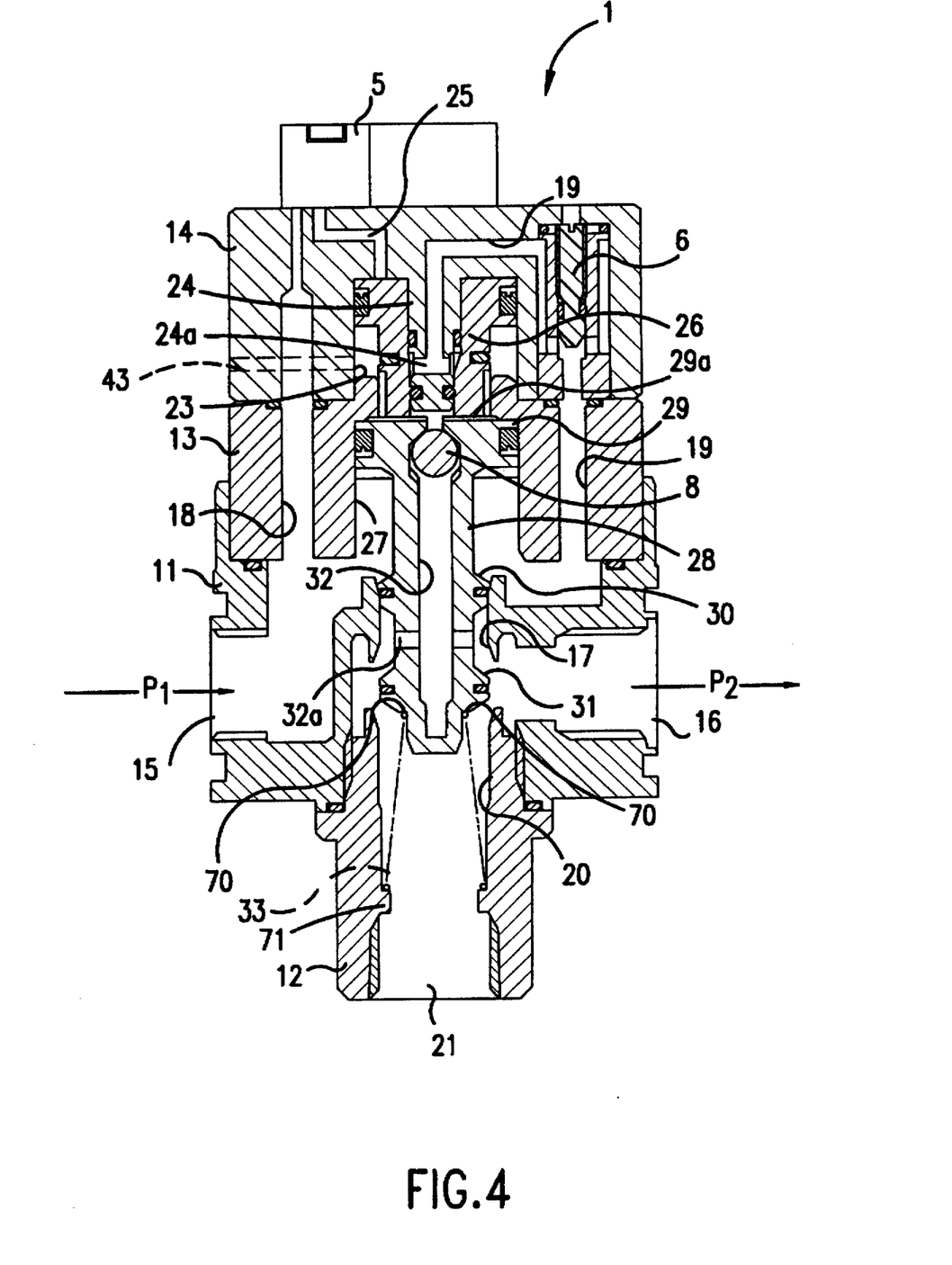
FIG. 4 is a sectional view of a slow start valve of a second embodiment in accordance with the present invention.

As shown in FIG. 4, a spring 33 is disposed between the lower end portion 70 of the second valve member 31 and the protrusion 71 formed in the inner wall of the bottom plug 12. This spring 33 has the biasing force of biasing the spool 28 upward even when no compressed air is supplied via the inlet port 15, holding the spool 28 and the piston 26 in a state as shown in FIG. 4.

Figure 2:
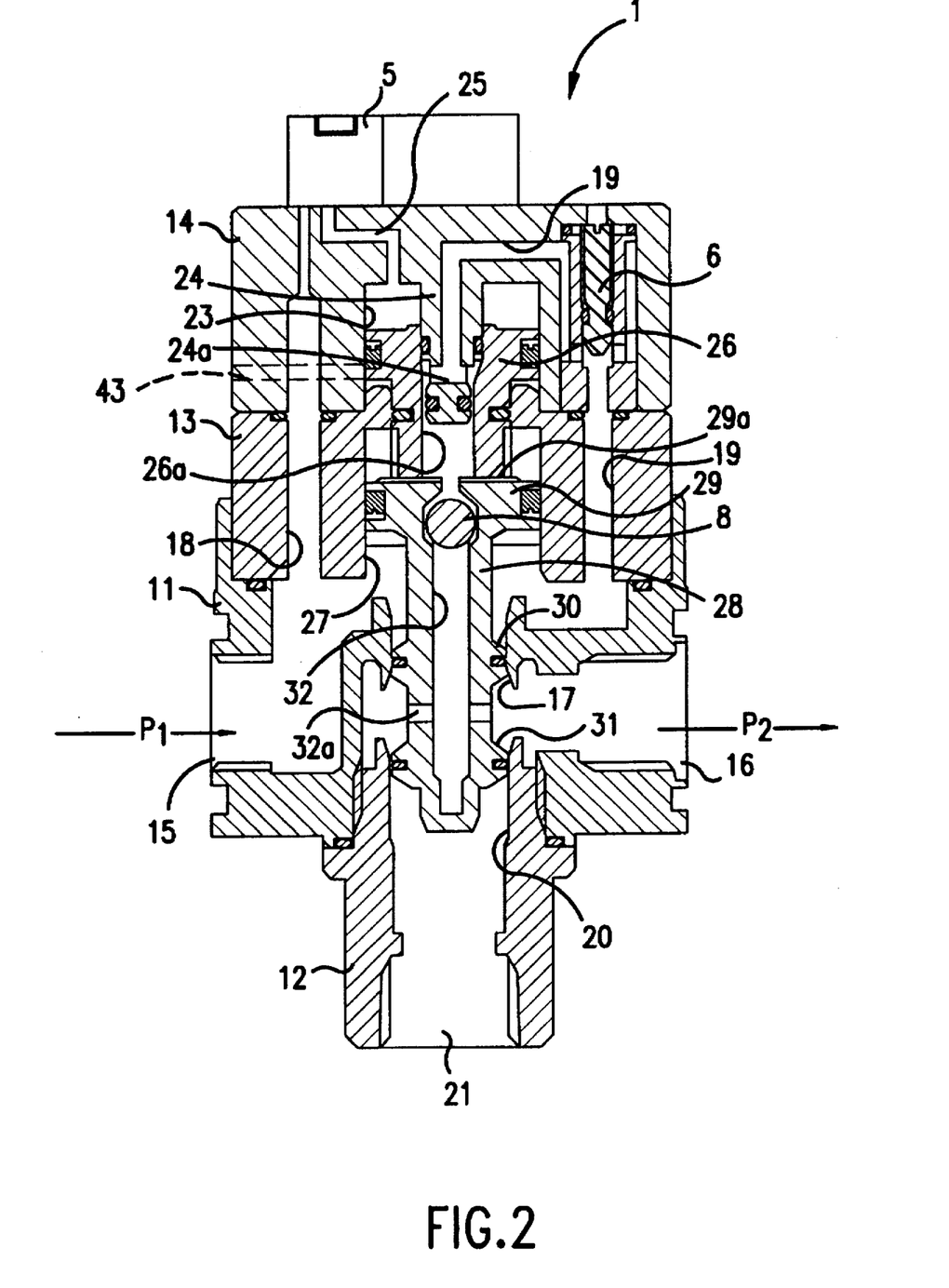
FIG. 2 is a sectional view of the slow start valve of FIG. 1 in a slow air supply state.
Figure 3:
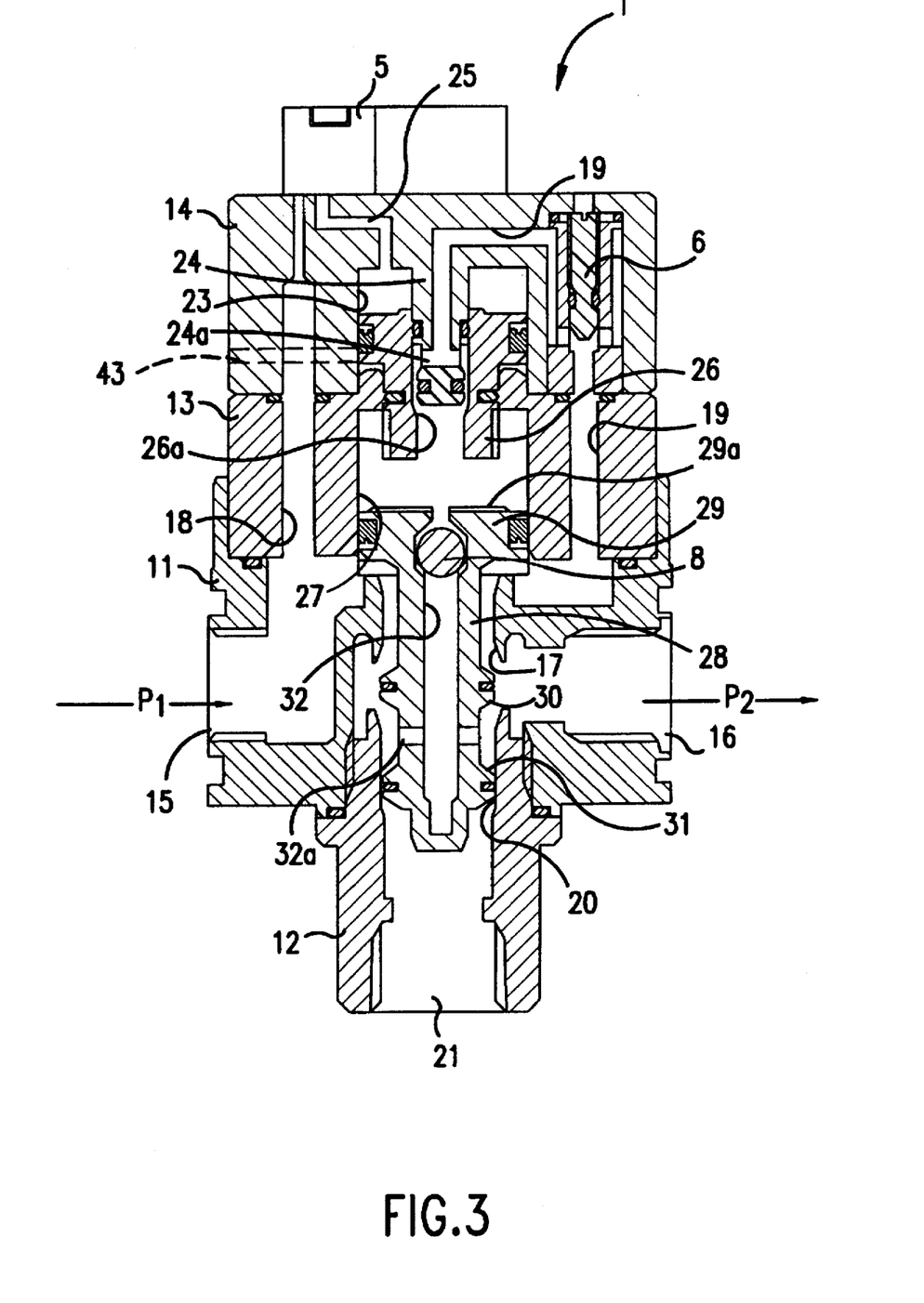
FIG. 3 is a sectional view of the slow start valve of FIG. 1 in a quick air supply state.

The slow start valve in the second embodiment performing the same operation as the slow start valve in the first embodiment, its detail explanation should be referred to the description of the first embodiment along with FIGS. 2 and 3. In this embodiment, operation of the spring 33 caused during the actuation of the slow start valve will be described.

For an initial period of operation of the slow start valve 1, the spring 33 urges the spool 28 upward when no compressed air is supplied via the inlet port 15, as shown in FIG. 4. When compressed air is supplied via the inlet port 15 and thereby the solenoid valve 5 is energized, the piston 26 is moved downward along with the spool 28 against the biasing force of the spring 33 and is held in a position for slow supply (as shown in FIG. 2).

In this state, the spring 33 is slightly compressed via the spool 28 and the spool 28 and the piston 26 are retained in a state shown in FIG. 2 as long as the sum of the thrust caused by the pressure acting on the lower surface of the piston 29, the starter resistance occurring in each sliding surface of the piston 29, the first and second valve members 30 and 31, and the resiliency of the spring 33 is greater than the thrust caused by the pressure acting on the upper surface of the piston 29.

Then, when the thrust by the pressure acting on the upper surface of the piston 29 exceeds the sum of the thrust by the pressure acting on the lower surface of the piston 29, the starter resistance occurring in each sliding surface of the piston 29, the valve members 30 and 31 and the resiliency of the spring 33, the spool 28 is moved more downward against the biasing force of the spring 33 (as shown in FIG. 3). This state allows the inlet port 15 to communicated with the outlet port 16 via the first valve opening 17, causing quick supply of compressed air to the pneumatic equipment.

To stop the actuation of the pneumatic equipment, as well as in the first embodiment, the solenoid three-way valve 5 is deenergized and thus the pressure in the cylinder 23 decreases and, in conjunction therewith, the pressure acting on the surface of the piston 29 in the cylinder 27 decreases. This causes the spool 28 to immediately move upward by the biasing force of the spring 33 back to the position shown in FIG. 4.

In the slow start valve 1 in the second embodiment, similarly to the first embodiment, both first and second valve members 30 and 31 are formed integrally in the spool 28, and the spool 28 is actuated by force of pressure of compressed air to effect slow supply, quick supply and exhaust, so that it can achieve a valve body of the slow start valve 1 by using only the spool 28 without requiring two valve members as in conventional slow start valves, thus enabling a small-sized slow start valve.

The slow start valve 1 in the second embodiment also uses a spool construction, not a poppet construction, that both first and second valve members 30 and 31 are formed integrally in the spool 28, so that it can reduce the number of components necessary or the slow start valve 1 and reduce remarkably costs thereof.

As same as the first embodiment, the slow start valve 1 in the second embodiment is constructed such that the compressed air supplied via the solenoid three-way valve 5 to the cylinder 23 causes the piston 26 to move downward, pushing the spool 28 at the same time, and then the compressed air supplied via the passage 19 causes the spool 28 to move more downward, separating from the piston 26, so that the second valve opening 20 is immediately shut off with the second valve member 31. Accordingly, in the slow start valve 1, all ports simultaneously in an open state as shown in conventional slow start valves will not exist, namely, all ports including the inlet port, the outlet port and the exhaust port leading to the atmosphere are not in an open state at the same time, so that it can prevent efficiently a large flow of compressed air from being exhausted via the exhaust port 21 during the start period of the slow start valve 1 thereby to avoid wasteful use of compressed air.

A third embodiment in accordance with the present invention will be described with reference to FIG. 5. The slow start valve in the third embodiment has a construction substantially similar to that of the first embodiment and therefore similar components to the first embodiment are identicated by reference numerals similar to those of corresponding or similar components of the first embodiment and their explanation should be referred to the description of the first embodiment. The characteristic construction of the slow start valve in the third embodiment will be described below.

Figure 5:
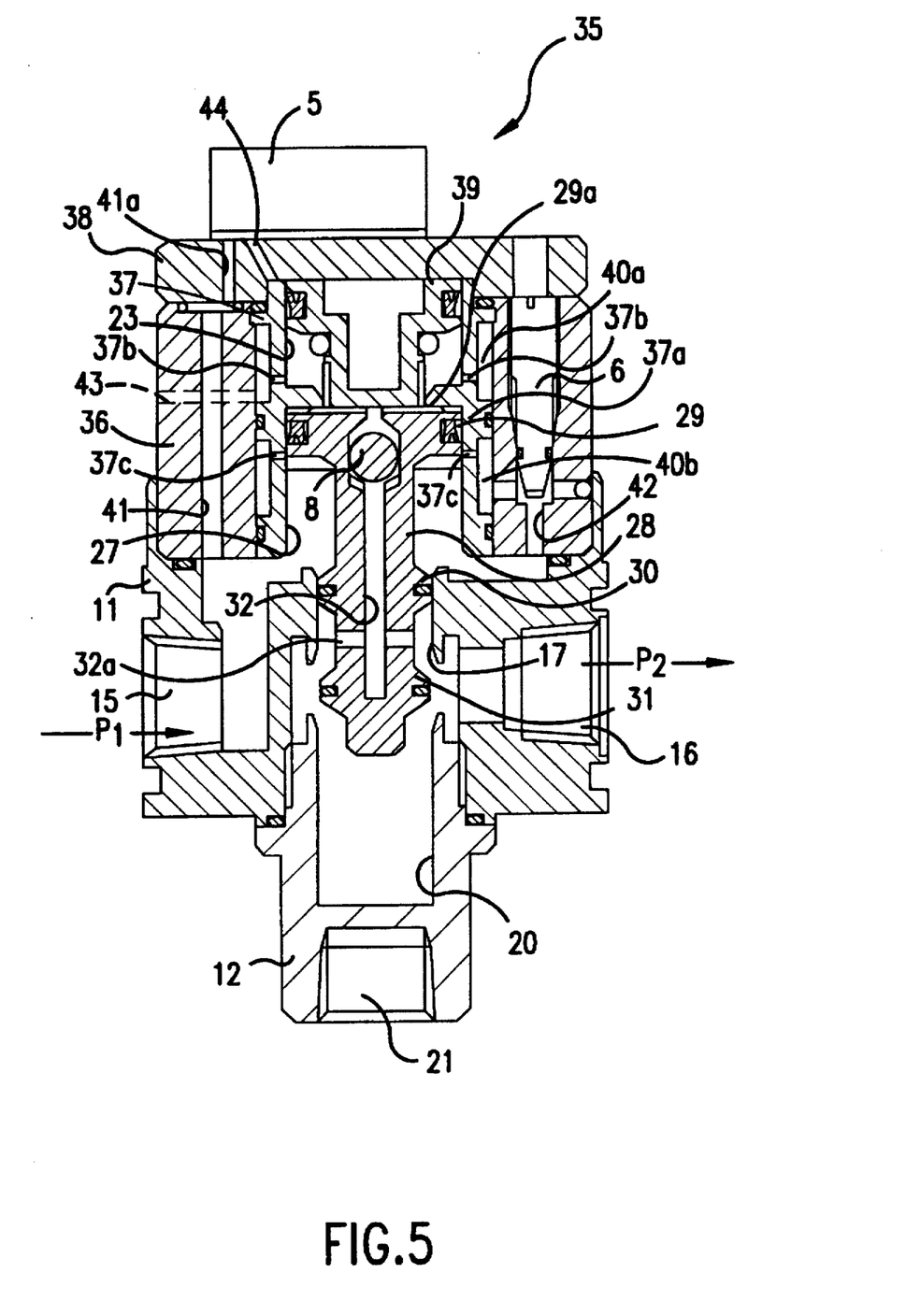
FIG. 5 is a sectional view of a slow start valve of a third embodiment in accordance with the present invention.

As shown in FIG. 5, the slow start valve 35 in the third embodiment, as well as the first embodiment, has a solenoid three-way valve 5, a body member 11, a bottom plug 12 and a spool 28. This slow start valve 35 is further provided with cylinder blocks 36 and 37 mounted on the body 11 and a cap 38 covering both top portions of cylinder blocks 36 and 37. The cylinder block 37 has a stopper 37a in a substantially center position of its inner surface, thereby separating the cylinder 37 into an upper and lower portions. Inside of the cylinder 37, a piston 39 and a spool 28 are slidably inserted in the upper and lower portions respectively, as shown in FIG. 5. The stopper 37a serves to limit respective slidable distances of the spool 28 and the piston 39. On the external surface of the cylinder block 37, integratedly formed are an upper, middle and lower protrusions formed along the outer peripheral surface of the cylinder block 37 to define an upper space 40a and a lower space 40b between the outer peripheral surface of the cylinder block 37 and the inner surface of the cylinder block 36. The cylinder block 37 is also provided with through holes 37b and 37c leading to the upper and lower spaces 40a and 40b, respectively.

Passages 41 and 41a are formed in the cylinder block 36 and the cap 38, respectively, to provide flow communication between the inlet port 15 and the solenoid three-way valve 5. A passage 42 is defined in the cylindrical block 36, communicating with the lower space 40b, and on its way a needle valve 6 is disposed to restrict the flow of compressed air. The cylindrical block 36 is also provided with a passage 43 leading from the upper space 40a to the atmosphere.

The cylinder block 37 has a cylinder 23 that communicates via a passage 44 formed in the cap 38 with the outlet port of the solenoid three-way valve 5 and also a cylinder 27 being coaxial with the cylinder 23.

Operation of the slow start valve 35 in the third embodiment will be described with reference to FIG. 5 through FIG. 7.

Before supply of compressed air via the inlet port 15, as shown in FIG. 5, the spool 28 is located with its top surface contacted with the upper end surface of the cylinder 27 due to sliding resistance between the outer peripheral surface of the piston 29 and the inner surface of the cylinder 27, thereby retaining the piston 39 with its upper end surface contacted with the lower surface of the cap 38.

When compressed air (pressure P1) is supplied via the inlet port 15, it pushes the lower surface of the piston 29 and at the same time penetrates into the passages 41, 41a and 42. At this time, the first valve opening 17 is closed with the first valve member 30, preventing compressed air from flowing to the outlet port 16. The secondary pressure P2 of the outlet port 16 in the above state is equal to zero.

The compressed air directed in the passages 41 and 41a flows in the solenoid three-way valve 5 being in a supply state by the energizing of the electromagnet portion of the solenoid valve 5 and then via the passage 44 into the cylinder 23, pushing the piston 39 downward. The piston 39 is therefore moved downward while pushing the piston 29 of the spool 28, as shown in FIG. 6. Simultaneously, the air existing in the cylinder 23 is released therefrom via the through hole 37b, the upper space 40a and the passage 43 to the atmosphere.

At the point when the piston 39 moving downward comes into contact with the stopper 37a, compressed air flowing in the passage 42 passes through the needle valve 6, the flow of compressed air being restricted therein, and flows via the through hole 37c into a space surrounded by the stopper 37a, the cylinder 27, the pistons 29 and 39.

As long as the sum of the thrust caused by the pressure acting on the lower surface of the piston 29 and the starter resistance occurring in each sliding surface of the piston 29, the first and second valve members 30 and 31 is greater than the thrust caused by the pressure acting on the upper surface of the piston 29, the piston 29 remains contacted with the piston 39. At this time, the compressed air flowing through the through hole 37c in the cylinder 27 further flows via the slit 29a, the check valve 8 and the air hole 32 of the spool 28 to the exhaust port 32a, exhausting therethrough to the outlet port 16.

The slow start valve 35 is constructed such that, in moving the spool 28 downward, the compressed air is exhausted via the exhaust port 32a when the second valve member 31 comes to contact with the second valve opening 20 and, for that period, the first valve member 30 is always in a contact state with the first valve opening 17. Accordingly, compressed air exhausted via the exhaust port 32a is not exhausted via the exhaust port 21 to the atmosphere.

The compressed air exhausted via the exhaust port 32a is supplied via the outlet port 16 to the pneumatic equipment (not shown). The secondary pressure P2 of the outlet port 16 at this time is in the range from 0 to 0.65 P1; 0<P2<0.65 P1. In this way, during the above operation, the compressed air exhausted via the outlet port 16, being directed via the passage 42 and restricted with the needle valve 6, is supplied in a small amount to the pneumatic equipment, increasing gradually the inside pressure thereof.

Figure 6:
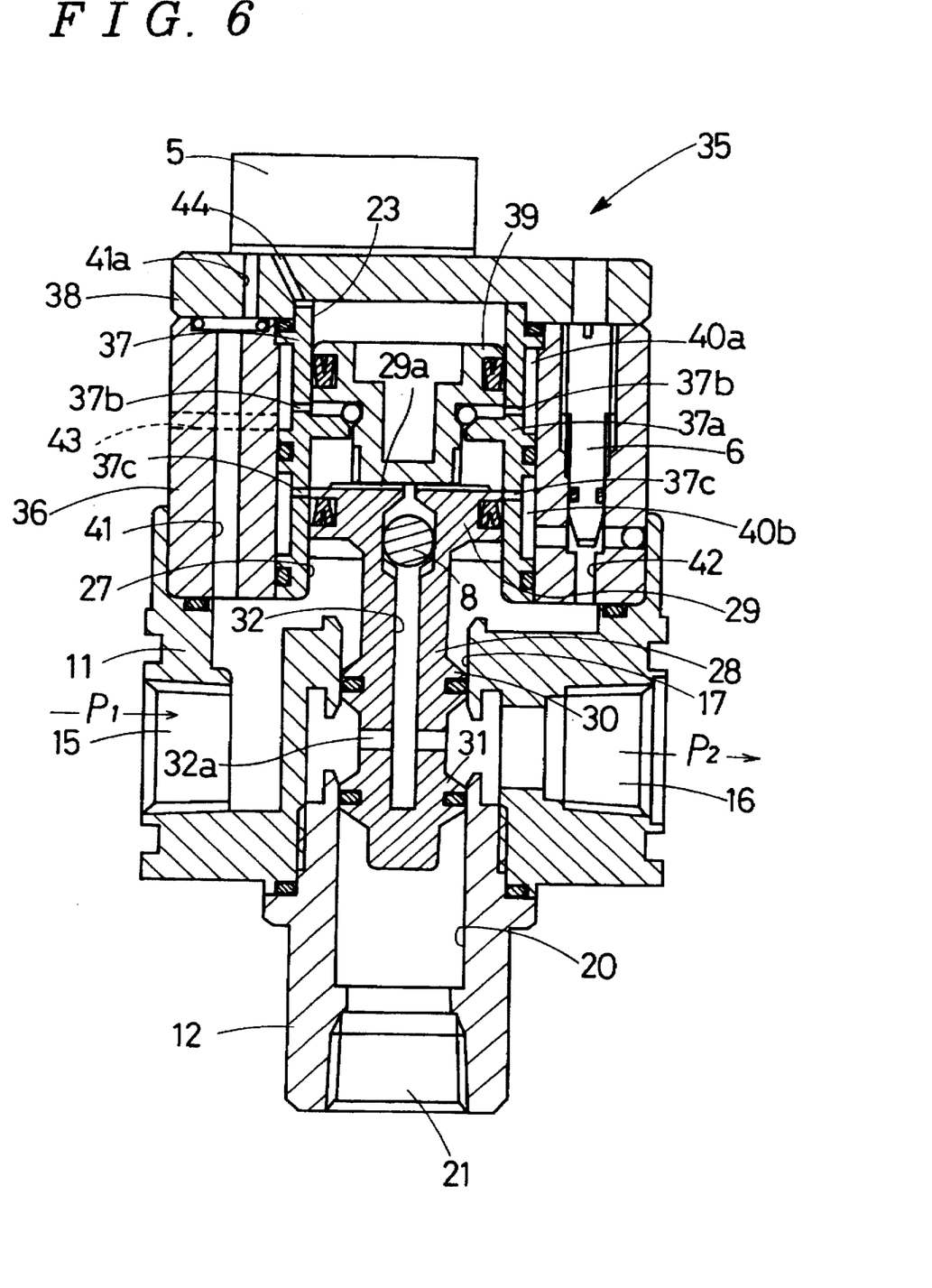
FIG. 6 is a sectional view of the slow start valve of FIG. 5 in a slow air supply state.

As mentioned above, although the compressed air is continuously supplied via the passage 42, the spool 28 is held in a state shown in FIG. 6 with the piston 39 contacting with the spool 28 because the sum of the thrust caused by the pressure acting on the lower surface of the piston 29 and starter resistance occurring in each sliding between the piston 29, the first and second valve members 30 and 31 and the first and second valve openings 17 and 20, respectively, is greater than the thrust by the pressure acting on the upper surface of the piston 29.

As compressed air is continuously supplied, furthermore, the compressed air penetrates via the slit 29a into a space between the outer peripheral surface of the piston 39 and the inner wall of the cylinder 27, increasing gradually the pressure acting on the upper surface of the piston 29. At the point when the thrust by the pressure acting on the upper surface of the piston 29 exceeds the sum of the thrust by the pressure acting on the lower surface of the piston 29 and the starter resistance acting on each sliding surface of the piston 29, the first and second valve members 30 and 31, the spool 28 is moved downward at a stroke to a position shown in FIG. 7.

When the first valve member 30 has passed through the first valve opening 17 due to the downward shifting of the spool 28, compressed air supplied from the inlet port 15 flows through the space between the lower surface of the piston 29 and the upper end of the first valve opening 17, and the first valve opening 17 to the outlet port 16. The secondary pressure of the outlet port 16 at this time exists in the range; 0.65 P1<P2<P1. At this time, the second valve member 31 is in contact with the second valve opening 20, thus retaining the exhaust port 20 in a closed state.

As mentioned above, before the first valve opening 17 opens, a small flow of compressed air is merely supplied via the exhaust port 32a to the outlet port 16, and then, when the inlet port 15 communicates the outlet port 16 directly via the first valve opening 17, a large flow of compressed air is supplied via the outlet port 16 to the pneumatic equipment.

When stopping operation of the pneumatic equipment or requiring urgent stop of actuation of same, meanwhile, the power supply to the solenoid three-way valve 5 is stopped. Consequently, the outlet port of the solenoid valve 5 comes to be in an exhaust state, exhausting the compressed air inside of the cylinder 23, and the inside pressure of the cylinder 23 decreases accordingly. With the decrease of pressure in the cylinder 23, the piston 39 is moved upward by force of the pressure in the cylinder 27 to a state shown in FIG. 5, and then the compressed air in the cylinder 27 is exhausted via the passage 43 to the atmosphere, thus decreasing the pressure acting on the upper surface of the piston 29 existing inside of the cylinder 27. The spool 28 is allowed to move back to a position shown in FIG. 5 by force of compressed air supplied via the inlet port 15, blocking off the flow communication leading from the through hole 37c to the exhaust port 32a. As a result, the outlet port 16 and the exhaust port 21 communicate with each other and the compressed air existing in the pneumatic equipment is exhausted via the exhaust port 21, removing the pressure acting on the pneumatic equipment.

In the slow start valve 35 in the third embodiment, similarly to the first embodiment, both first and second valve members 30 and 31 are formed integrally in the spool 28, and the spool 28 is actuated by force of pressure of compressed air to effect slow supply, quick supply and exhaust, so that it can achieve a valve body of the slow start valve 35 by using only the spool 28 without requiring two valve members as conventional slow start valves, thus enabling a small-sized slow start valve 35.

The slow start valve 35 in the third embodiment also uses a spool construction, not a poppet construction, that both first and second valve members 30 and 31 are formed integrally in the spool 28, so that it can reduce the number of components necessary for the slow start valve 35 and reduce remarkably costs thereof.

The slow start valve 35 in the third embodiment is constructed such that the compressed air supplied via the solenoid three-way valve 5 to the cylinder 23 causes the piston 39 to move downward, pushing the spool 28 at the same time, and then the compressed air supplied via the passage 42 causes the spool 28 to move more downward, separating from the piston 39, so that the second valve opening 20 is immediately shut off with the second valve member 31.

The slow start valve 35 consequently will not be in all ports simultaneously in an open state as shown in conventional slow start valves, namely, all ports including the inlet port, the outlet port and the exhaust port leading to the atmosphere are not in an open state at the same time, so that it can prevent efficiently a large flow of compressed air from being exhausted via the exhaust port 21 during start-up of the slow start valve thereby to avoid wasteful use of compressed air.

A slow start valve in a fourth embodiment according to the present invention will be described below with reference to FIG. 8. The slow start valve in this embodiment has substantially the same construction as that of the third embodiment except for a spring being disposed between the lower portion of the spool 28 and a stopper protrusion formed on the inner wall of the bottom plug 12. The following description for the fourth embodiment is therefore related only to the construction different from the third embodiment. The components of the fourth embodiment are indicated by reference numerals similar to those of corresponding or similar components of the third embodiment.

Figure 8:
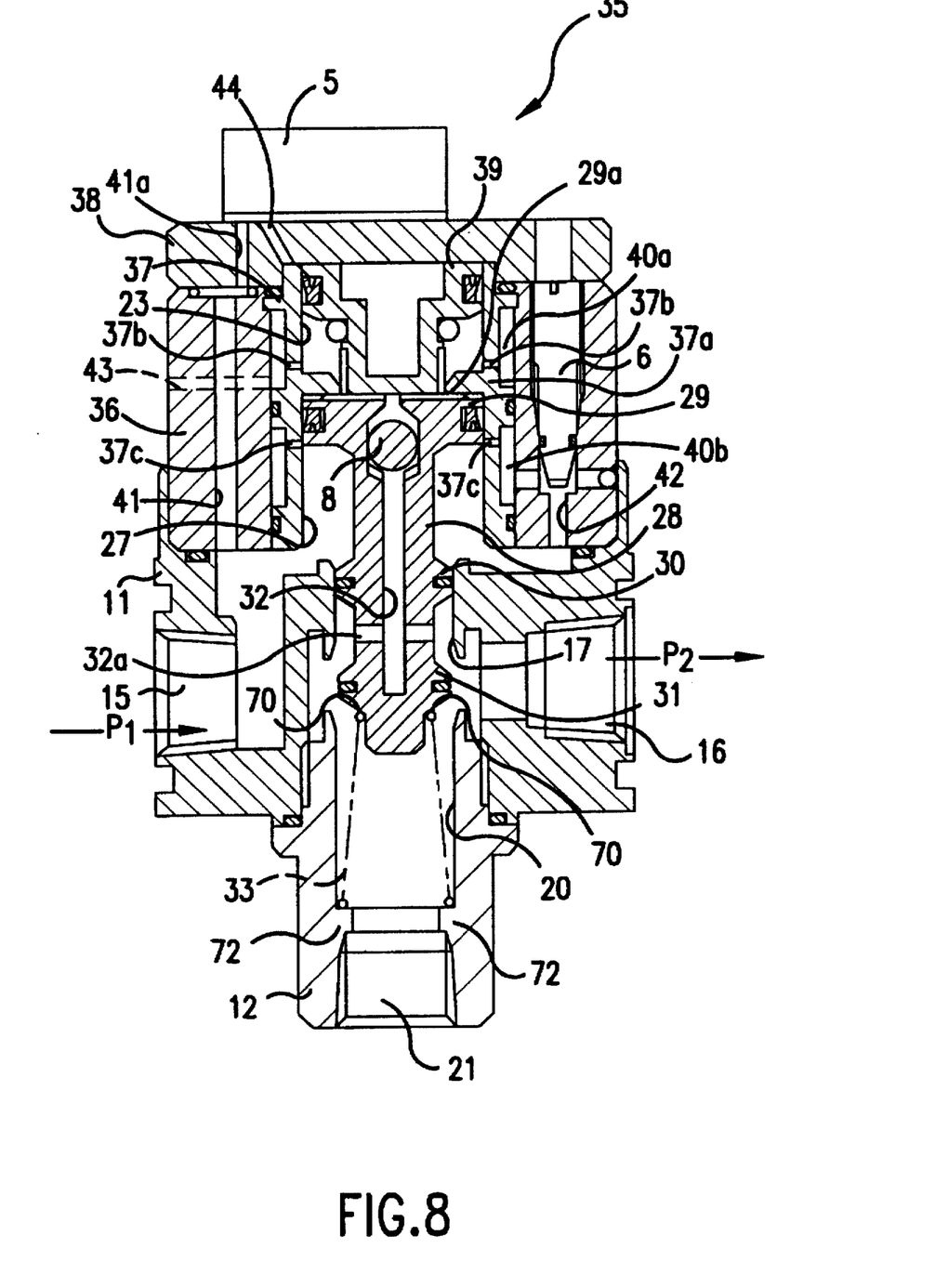
FIG. 8 is a sectional view of a slow start valve of a fourth embodiment in accordance with the present invention.

As shown in FIG. 8, a spring 33 is disposed between the lower end portion 70 of the second valve member 31 and a stopper protrusion 72 formed on the inner wall of the bottom plug 12. This spring 33 has the force of biasing the spool 28 upward even when no compressed air is provided via the inlet port 15, holding the spool 28 and the piston 39 in a state shown in FIG. 4.

Figure 7:
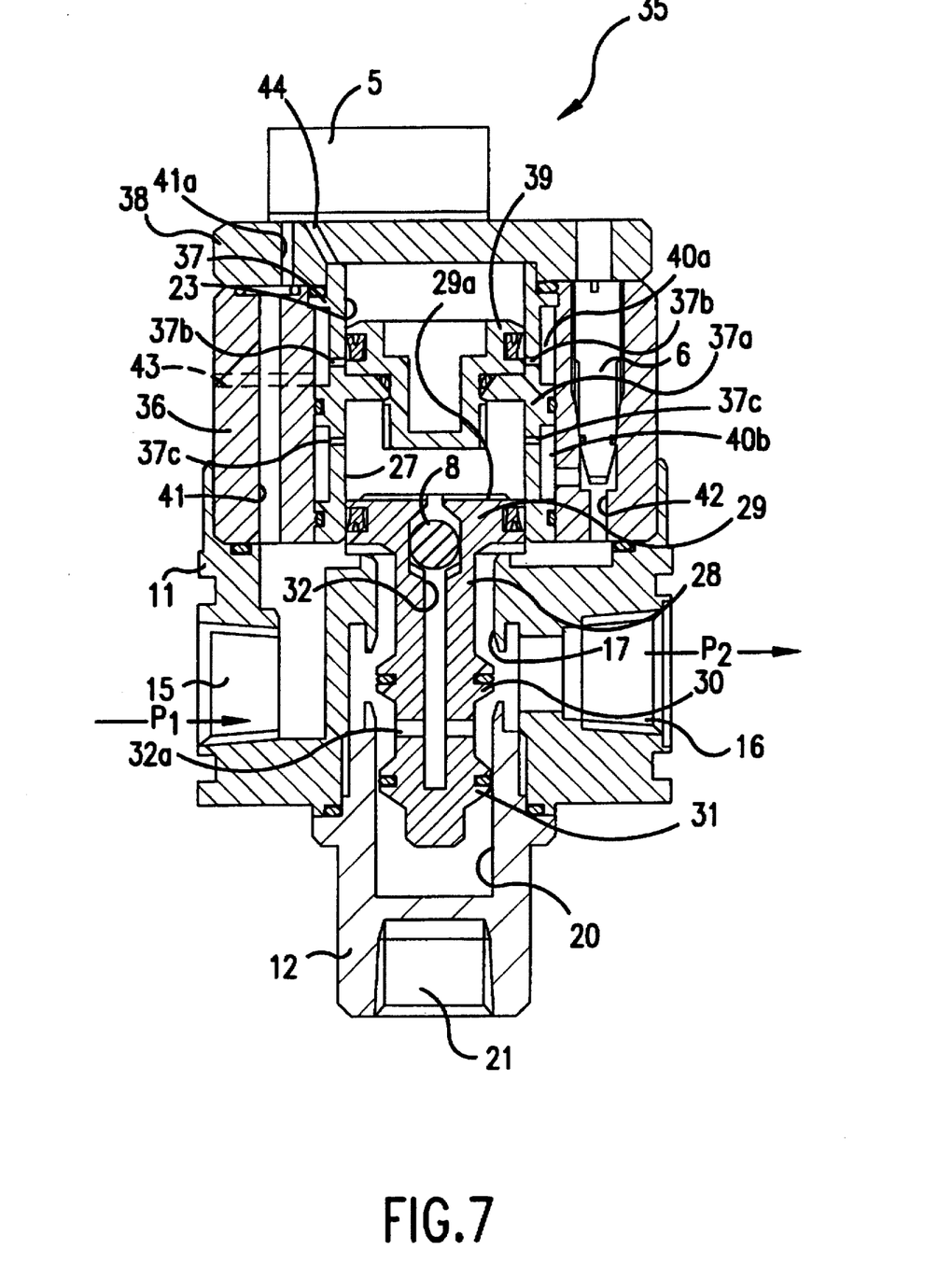
FIG. 7 is a sectional view of the slow start valve of FIG. 5 in a quick air supply state.

The slow start valve in the fourth embodiment operates as in the third embodiment, and its detail explanation should be referred to the description of the third embodiment with reference to FIG. 5 through FIG. 7. In this embodiment, operation of the spring 33 caused in accordance with the actuation of the slow start valve 35 will be described.

During start-up of the slow start valve 1, the spring 33 urges the spool 28 and the piston 39 upward when no compressed air is supplied via the inlet port 15 as shown in FIG. 8 and, as compressed air is supplied and the solenoid valve 5 is energized, the piston 39 along with the spool 28 gradually moves downward against the biasing force of the spring 33 and are held in a position for slow supply (referring to FIG. 6). In this state, the spring 33 is slightly compressed via the spool 28 and the spool 28 and the piston 39 are retained there as long as the sum of the thrust caused by the pressure acting on the lower surface of the piston 29, the starter resistance occurring in each sliding surface of the piston 29, the first and second valve members 30 and 31, and the resiliency of the spring 33 is greater than the thrust caused by the pressure acting on the upper surface of the piston 29.

After that, when the thrust by the pressure acting on the upper surface of the piston 29 exceeds the sum of the thrust by the pressure acting on the lower surface of the piston 29, the starter resistance occurring in each sliding surface of the piston 29, the valve members 30 and 31 and the resiliency of the spring 33, the spool 28 is moved more downward against the biasing force of the spring 33 (referring to FIG. 7). This state allows the inlet port 15 to communicate with the outlet port 16 via the first valve opening 17, thus causing quick supply of compressed air.

To stop the actuation of the pneumatic equipment, as well as in the third embodiment, when de-energizing the solenoid three-way valve 5, the pressure in the cylinder 23 decreases and the pressure acting on the surface of the piston 29 in the cylinder 27 decreases. This causes the spool 28 to immediately move upward by the biasing force of the spring 33 and the compressed air supplied via the inlet port 15 back to the position shown in FIG. 8.

In the slow start valve 35 in the fourth embodiment, as well as that in the third embodiment, both first and second valve members 30 and 31 are formed integrally in the spool 28, and the spool 28 is actuated by force of pressure of compressed air to effect slow supply, quick supply, and exhaust, so that it can achieve a valve body of the slow start valve 35 by using only the spool 28 without requiring two valve members as in conventional slow start valves, thus enabling a small-sized slow start valve.

The slow start valve 35 in the fourth embodiment also uses a spool construction, not a poppet construction, that both first and second valve members 30 and 31 are formed integrally in the spool 28, so that it can reduce the number of components necessary for the slow start valve 35 and remarkably reduce costs thereof.

The slow start valve 1 in the fourth embodiment is constructed such that the compressed air supplied via the solenoid three-way valve 5 to the cylinder 23 causes the piston 39 to move at a stroke downward, pushing the spool 28 at the same time, and then the compressed air supplied via the passage 42 causes the spool 28 to move more downward, separating from the piston 39, so that the second valve opening 20 is immediately shut off with the second valve member 31.

The slow start valve 35 consequently will not be in an all ports simultaneously open state as shown in conventional slow start valves, namely, all ports including the inlet port, the outlet port and the exhaust port leading to the atmosphere are not in an open state at the same time, so that it can prevent efficiently a large flow of compressed air from being exhausted via the exhaust port 21 during start-up of the slow start valve thereby to avoid wasteful use of compressed air.

While the invention has been particularly shown and described with reference to preferred embodiments thereof, it will be understood by those skilled in the art that the foregoing and other changes in form and details can be made therein without departing from the spirit and scope of the invention.

For instance, although the check valve 8 in the above embodiments is disposed within the air hole 32, it may be eliminated.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments are chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A slow start valve comprising:
   a valve body having an inlet port, an outlet port and a secondary pressure exhaust port, and defining a main flow passage between the inlet port and the outlet port;
   a main valve for controlling fluid flow between said inlet, outlet and exhaust ports, slidably disposed within said valve body;
   a bypass flow passage diverging from the main flow passage in said valve body;
   a flow adjusting member disposed in said bypass flow passage; and
   a control valve for controlling flow of fluid directed in said bypass flow passage,
   said control valve controlling supply of a slight flow of fluid via the bypass flow passage to the outlet port for a predetermined period from a start of fluid supply via said inlet port to provision of fluid communication through the main flow passage by the main valve,
   wherein said main valve is constructed of a first valve member for controlling opening and blocking of the main flow passage and a second valve member for controlling opening and blocking of the flow passage between the outlet port and the exhaust port, said first and second valve members being formed coaxially and integrally with each other.

2. A slow start valve according to claim 1, wherein said main valve is a spool member.

3. A slow start valve according to claim 2, wherein said spool member is internally provided with an air hole selectively communicating with said bypass flow passage, the air hole having an exhaust opening to the main flow passage.

4. A slow start valve according to claim 3, wherein said air hole is provided with a check valve therein.

5. A slow start valve according to claim 3, wherein said valve body includes a body member, the body member having a first cylindrical valve opening in which said first valve member is slidably inserted.

6. A slow start valve according to claim 5, wherein said valve body includes a plug member connected to a lower portion of the body member, the plug member having a second cylindrical valve opening coaxially with said first valve opening, in which said second valve member is slidably inserted.

7. A slow start valve according to claim 5, wherein said main flow passage is blocked for said predetermined period with the first valve member in conjunction with the first valve opening, and fluid supplied via said inlet port flows via the bypass flow passage, the air hole and the exhaust opening to the outlet port.

8. A slow start valve according to claim 5, wherein said main flow passage is open after said predetermined period with the first valve member and the first valve opening, and fluid supplied via said inlet port flows through the main flow passage to the outlet port.

9. A slow start valve according to claim 5, wherein said valve body includes first and second block members mounted on an upper portion of the body member.

10. A slow start valve according to claim 9, wherein said first block member includes a first cylinder and said second block member includes a second cylinder.

11. A slow start valve according to claim 10, wherein said bypass flow passage is constructed of a first bypass flow passage extending from the inlet port, via said first and second block members and the control valve to the first cylinder, and a second bypass flow passage extending from the inlet port, via said first and second block members, to the second cylinder.

12. A slow start valve according to claim 11, wherein a first piston member is slidably inserted in said first cylinder and a second piston member formed at an upper portion of the spool member is slidably inserted in said second cylinder.

13. A slow start valve according to claim 12, wherein said first piston member is urged to slide in the first cylinder by force of fluid flowing via the first bypass flow passage, and said second piston member is urged to slide in the second cylinder in accordance with movement of the first piston member.

14. A slow start valve according to claim 13, wherein said second bypass flow passage communicates with the air hole of the spool member when the second piston member is moved.

15. A slow start valve according to claim 9, wherein a cylinder member is disposed in an inner peripheral wall surrounded by said first and second block members, the cylinder member having a stopper at an approximate center of its inner wall to define a first cylinder chamber and a second cylinder chamber.

16. A slow start valve according to claim 15, wherein said bypass flow passage is constructed of a first bypass flow passage extending from the inlet port, via said first and second block members and the control valve to the first cylinder chamber, and a second bypass flow passage extending from the inlet port, via said first and second block members, to the second cylinder chamber.

17. A slow start valve according to claim 16, wherein a first piston member is slidably inserted in said first cylinder chamber and a second piston member formed in the upper portion of the spool member is slidably inserted in said second cylinder chamber.

18. A slow start valve according to claim 17, wherein said first piston member is urged to slide in the first cylinder chamber by force of fluid flowing via the first bypass flow passage, and said second piston member is urged to slide in the second cylinder chamber in accordance with movement of the first piston member.

19. A slow start valve according to claim 18, wherein said second bypass flow passage communicates with the air hole of the spool member when the second piston member is moved.

* * * * *